US 9,104,381 B2

(12) United States Patent
Kuramochi

(10) Patent No.: US 9,104,381 B2
(45) Date of Patent: Aug. 11, 2015

(54) BIAXIAL HINGE

(71) Applicant: KEM HONGKONG LIMITED, Tsimshatsui Kowloon (HK)

(72) Inventor: Ryuta Kuramochi, Kanagawa (JP)

(73) Assignee: KEM HONGKONG LIMITED, Tsimshatsui Kowloon (HK)

( * ) Notice: Subject to any disclaimer, the term of this patent is extended or adjusted under 35 U.S.C. 154(b) by 0 days.

(21) Appl. No.: 13/904,683

(22) Filed: May 29, 2013

(65) Prior Publication Data

US 2013/0318746 A1 Dec. 5, 2013

(30) Foreign Application Priority Data

May 30, 2012 (JP) ................. 2012-123093

(51) Int. Cl.
*E05D 3/06* (2006.01)
*G06F 1/16* (2006.01)

(52) U.S. Cl.
CPC ......... *G06F 1/1681* (2013.01); *Y10T 16/54038* (2015.01); *Y10T 16/5478* (2015.01)

(58) Field of Classification Search
CPC .................. G06F 1/1681; E05Y 2900/606
USPC .......... 16/366, 342, 371, 330, 303, 337, 338, 16/340; 361/679.27; 455/575.3; 379/433.11, 433.13
See application file for complete search history.

(56) References Cited

U.S. PATENT DOCUMENTS

| | | | |
|---|---|---|---|
| 6,253,419 B1 * | 7/2001 | Lu ................................ | 16/340 |
| 6,519,812 B2 * | 2/2003 | Ko et al. ....................... | 16/354 |
| 7,515,707 B2 * | 4/2009 | Ka et al. ................... | 379/433.12 |
| 7,738,930 B2 * | 6/2010 | Petrella ....................... | 455/575.3 |
| 7,832,056 B2 * | 11/2010 | Kuwajima et al. ............. | 16/354 |
| 7,861,377 B2 * | 1/2011 | Chuan ............................ | 16/338 |
| 7,907,415 B2 * | 3/2011 | Ueyama ........................ | 361/749 |
| 8,006,347 B2 * | 8/2011 | Sue et al. ......................... | 16/338 |
| 8,205,303 B2 * | 6/2012 | Chang ............................. | 16/342 |
| 8,261,411 B2 * | 9/2012 | Shen ............................... | 16/340 |
| 8,296,905 B2 * | 10/2012 | Zhang et al. ..................... | 16/366 |
| 8,302,260 B2 * | 11/2012 | Chen et al. ...................... | 16/330 |
| 8,339,777 B2 * | 12/2012 | Ling .......................... | 361/679.27 |
| 8,385,991 B2 * | 2/2013 | Wang et al. .................. | 455/575.3 |
| 8,451,601 B2 * | 5/2013 | Bohn et al. ................ | 361/679.55 |
| 8,615,848 B2 * | 12/2013 | Mitsui ............................. | 16/366 |

(Continued)

FOREIGN PATENT DOCUMENTS

CN 102635627 A * 8/2012
JP 2009-063039 3/2009

*Primary Examiner* — Victor Batson
*Assistant Examiner* — Jason W San
(74) *Attorney, Agent, or Firm* — Notaro, Michalos & Zaccaria P.C.

(57) ABSTRACT

To provide a biaxial hinge which enables an opening/closing movement of terminal, such as notebook PC, from 0° up to 180° or more, which ensures the opening/closing movement starting from a stable stopping position available at any opening/closing angle, a second hinge shaft attached to a second casing and a second hinge shaft attached to a second casing are connected to each other via a joint member and provided so as to be rotatable relative to each other, and a selective rotation restricting device is provided between the both hinge shafts. The selective rotation restricting device is so structured that it allows the both hinge shafts to rotate, when the first casing and the second casing are in a closed state, and it restricts one of the first hinge shaft and the second hinge shaft in rotation, when the other hinge shaft rotates relative to the one hinge shaft.

1 Claim, 22 Drawing Sheets

(56) References Cited

U.S. PATENT DOCUMENTS

| | | | |
|---|---|---|---|
| 8,627,546 B2* | 1/2014 | Zhang et al. | 16/368 |
| 8,720,011 B1* | 5/2014 | Hsu et al. | 16/368 |
| 8,776,319 B1* | 7/2014 | Chang et al. | 16/366 |
| 8,904,601 B2* | 12/2014 | Hsu | 16/366 |
| 8,914,946 B2* | 12/2014 | Hsu et al. | 16/366 |
| 8,959,720 B2* | 2/2015 | Hsu | 16/366 |
| 2006/0112517 A1* | 6/2006 | Luo et al. | 16/330 |
| 2007/0054710 A1* | 3/2007 | Pan | 455/575.3 |
| 2008/0109995 A1* | 5/2008 | Kuwajima et al. | 16/354 |
| 2008/0307608 A1* | 12/2008 | Goto | 16/366 |
| 2009/0000062 A1* | 1/2009 | Yamanami | 16/366 |
| 2011/0099759 A1* | 5/2011 | Chang | 16/331 |
| 2011/0119867 A1* | 5/2011 | Chen et al. | 16/342 |
| 2011/0179600 A1* | 7/2011 | Chang | 16/342 |
| 2011/0252600 A1* | 10/2011 | Chang | 16/277 |
| 2011/0265288 A1* | 11/2011 | Chiang | 16/341 |
| 2011/0283480 A1* | 11/2011 | Chang | 16/333 |
| 2011/0289726 A1* | 12/2011 | Zhang et al. | 16/250 |
| 2012/0309470 A1* | 12/2012 | Park et al. | 455/575.3 |
| 2013/0016492 A1* | 1/2013 | Wang et al. | 361/820 |
| 2013/0135809 A1* | 5/2013 | Uchiyama et al. | 361/679.09 |
| 2014/0223693 A1* | 8/2014 | Hsu | 16/282 |

* cited by examiner

BIAXIAL HINGE

FIELD OF THE INVENTION

The invention relates to a biaxial hinge which is suitable for use in terminal devices, such as notebook PC, mobile PC and PDA.

BACKGROUND ART

In terminal devices, such as notebook PC, mobile PC and PDA, comprising a first casing provided with a keyboard portion and a second casing provided with a display portion, some use uniaxial hinges connecting the first casing and the second casing, such that both casings are openable/closable in an upward/downward direction; other terminal devices employ biaxial hinges comprising two axes, wherein the second casing is rotatable with regard to the first casing, after the former is opened 90 degrees relative to the latter. The biaxial hinge according to the invention, in contrast to the above-mentioned biaxial hinge, relates to the one which is so designed that a first casing and a second casing can be opened 180 degrees respectively in upward/downward direction, i.e. of 360 degrees in total.

Conventionally, a biaxial hinge of the above-mentioned structure, as disclosed in JP Laid-Open Patent Application No. 2009-063039, is known. The biaxial hinge according to the patent document is characterized in that a shaft attached to a first member (casing) and a further shaft attached to a second member (casing) are connected to each other via a joint arm, and that a friction torque generating means is provided on each shaft, and that a link arm is provided; however, the hinge is not so designed that the first member can be opened more than 180 degrees relative to the second member, nor that the first casing can be opened relative to the second casing with regularity.

SUMMARY OF THE INVENTION

In recent years, requirements for terminal device, such as notebook PC, have been diversified, and correspondingly the functions of the terminal device are wide-ranged. On this background, to obtain an additional use of a terminal device e.g. not only as notebook PC but also as tablet PC, there is a growing need for a hinge which is so structured that the first casing and the second casing being components of a terminal device are openable/closable relative to each other with predetermined regularity, so as to restrict an opening/closing operation of one casing during the opening/closing operation of the other casing, as well as to restrict the casing under the opening/closing operation to either one of the first casing and the second casing.

Therefore, an object of the invention is to provide a biaxial hinge which enables an opening/closing movement of terminal device, such as notebook PC, from 0° up to 180° or more, and preferably up to 360°, which ensures the opening/closing movement starting from a stable stopping position available at any opening/closing angle.

To fulfill the above-mentioned object, a biaxial hinge according to a first aspect of the invention is characterized in that a first hinge shaft attached to the first casing side and a second hinge shaft attached to the second casing side are connected to each other via a joint member and provided so as to be rotatable relative to each other, wherein a selective rotation restricting means is provided between the first hinge shaft and the second hinge shaft, and that the selective rotation restricting means is so structured that it allows the both hinge shafts to rotate, when the first casing and the second casing are in a closed state, and it restricts one of the first hinge shaft and the second hinge shaft in rotation, when the other hinge shaft rotates relative to the one hinge shaft.

Moreover, a biaxial hinge according to a second aspect of the invention is characterized in that a first hinge shaft attached to the first casing side and a second hinge shaft attached to the second casing side are connected to each other via a joint member and provided so as to be rotatable relative to each other, wherein a selective rotation restricting means is provided between the first hinge shaft and the second hinge shaft, and the selective rotation restricting means allows the second hinge shaft to rotate so that the second casing can be opened and closed, when the first casing and the second casing are found in a closed state, as well as allow the first hinge shaft to rotate so that the first casing is openable/closable, when the second casing is opened at a predetermined opening angle relative to the first casing.

Still further, a biaxial hinge according to a third aspect of the invention is characterized in that it comprises a first hinge shaft attached to the side of a first casing; a second hinge shaft attached to the side of a second casing; a joint member rotatably connecting the hinge shafts to each other, the first hinge shaft and the second hinge shaft passing through the joint member respectively in an identical direction; a slide guide member provided opposite to the joint member, the first hinge shaft and the second hinge shaft passing through the slide guide member; a selective rotation restricting means provided between the slide guide member and the joint member, for selectively restricting rotation of the first hinge shaft and the second hinge shaft; a friction torque generating means provided on one side of the selective rotation restricting means; and a suction means provided on the other side of the selective rotation restricting means; and a stopper means restricting a rotation angle of the first hinge shaft and the second hinge shaft.

Under such circumstance, a biaxial hinge according to a fourth aspect of the invention is characterized in that a selective rotation restricting means comprises a locking member provided between the joint member and the slide guide member so as to be slidable in an upward/downward direction between the first hinge shaft and the second hinge shaft and comprising a first cam convex portion and a second cam convex portion, a first locking cam member having a first cam concave portion and provided above the locking member, the first hinge shaft passing through and engaging with the first locking cam member, and a second locking cam member having a second cam concave portion and provided below the locking member, the second hinge shaft passing through and engaging with the second locking cam member.

Furthermore, a biaxial hinge according to a fifth aspect of the invention is characterized in that the friction torque generating means comprises a friction plate provided, wherein the first hinge shaft rotatably passes through between a selective rotation restricting means and a flange portion of the first hinge shaft, and the second hinge shaft rotatably passes through between the selective rotation restricting means and a flange portion of the second hinge shaft; an upper first A friction washer and an upper second A friction washer provided on both side portions of the friction plate such that they are restricted in rotation by the first hinge shaft; a lower first B friction washer and a lower second B friction washer provided on both side portions of the friction plate such that they are restricted in rotation by the second hinge shaft.

Still further, a biaxial hinge according to a sixth aspect of the invention is characterized in that the suction means comprises a first A curved cam convex portion and a first B curved cam convex portion so provided on a first cam follower that they are movable in an axial direction but restricted in rotation by a first hinge shaft, the cam convex portions respectively facing a first A curved cam concave portion and a first B curved cam concave portion; a second A curved cam convex portion and a second B curved cam convex portion so provided on a second cam follower that they are movable in an axial direction but restricted in rotation by a second hinge shaft, the cam convex portions respectively facing a second A curved cam concave portion and a second B curved cam concave portion; a first elastic means provided on the first hinge shaft and a second elastic means provided on the second hinge shaft.

Still further, a biaxial hinge according to a seventh aspect of the invention is characterized in that the stopper means comprises a first stopper piece provided on an outer circumference of the first locking cam member; a second stopper piece provided on an outer circumference of the second locking cam member; a first stopper portion and a second stopper portion provided on the slide guide member.

Still further, a biaxial hinge according to an eighth aspect of the invention is characterized in that the biaxial hinge according to each of the above-mentioned aspects of the invention is used.

The invention is structured as mentioned above. Therefore, according to a first aspect of the invention, a selective rotation restricting means enables both of a first casing and a second casing to be opened/closed, when the first casing and the second casing are entirely closed relative to each other, as well as when they are fully opened; however, if either one of the first casing and the second casing is under opening/closing operation, the either one of a first hinge shaft and a second hinge shaft is restricted in rotation, therefore, the other one of the first casing and the second casing is restricted in opening/closing operation.

Moreover, according to a second aspect of the invention, a selective rotation restricting means enables exclusively a second casing to be opened/closed, when the first casing and the second casing are entirely closed relative to each other; it only then allows a first casing to rotate (be opened/closed), when the second casing is opened to a predetermined degree. During the opening/closing movement, the second casing is restricted in rotation.

Still further, according to a third aspect of the invention, if a selective rotation restricting means selectively allows either one of a first casing and a second casing to rotate, friction torque generating means provided on both of a first hinge shaft and a second hinge shaft restrict a rotation torque. In this manner, an opening/closing operation of the first casing and the second casing is freely arrested the casings are held at any opening/closing angle. Still further, according to the above-mentioned aspect, a suction means enables an automatic closing movement of the first casing and the second casing from a predetermined opening/closing angle.

Still further, according to a fourth aspect of the invention, an upper first locking cam member and a lower second locking cam member form a selective rotation restricting means, and the first locking cam member is restricted in rotation and attached to a first hinge shaft provided with a cam concave portion on its outer circumference, and the second locking cam member to a second hinge shaft; on the other hand, a locking member is provided between the joint member and the slide guide member so as to be slidable between in an upward/downward direction between the first hinge shaft and the second hinge shaft and comprises a first cam convex portion on its upper portion and a second cam convex portion on its lower portion. Such an arrangement allows the first cam convex portion and the second cam convex portion of the locking member to face a first cam concave portion of the first locking cam member and a second cam concave portion of the second locking cam member, so that such a position allows both of the first casing to which a first hinge shaft is attached and the second casing to which a second hinge shaft is attached to be opened/closed, but once either one of the first casing and the second casing is opened/closed to some degree, either one of the first cam convex portion and the second cam convex portion faces either one of the cam concave portion and a second cam concave portion, while the other one of the first cam convex portion and the second cam convex portion faces respective outer circumference of the locking member. In this manner, either one of the first casing and the second casing is restricted in rotation, and other one of the first casing and the second casing is restricted in opening/closing operation.

Still further, if a biaxial hinge is constructed as in a fifth aspect, friction torque generating means generate a friction torque during rotation of a first hinge shaft and a second hinge shaft, so that a first casing and a second casing can be stably arrested and held at any opening/closing angle during their respective opening/closing operation.

Still further, if a biaxial hinge is constructed as in a sixth aspect, the suction means enables the following: even if either one of a first hinge shaft and a second hinge shaft rotates together with an opening/closing operation of a first casing and second casing, a first hinge shaft and a second hinge shaft, as well as elastic means allow a first A curved cam convex portion, a first B curved cam convex portion, a second A curved cam convex portion and a second B curved cam convex portion to sink at a closed position and at an opened position, so that a first casing and a second casing are closed as if one were absorbed into the other just before an entire opening and an entire closing, and both casings are stably arrested and held at a closed position and at an opened position.

If a biaxial hinge is constructed as in a seventh aspect, a stopper means restricts a first casing and a second casing to a predetermined opening/closing angle.

Moreover, if a biaxial hinge is constructed as in an eighth aspect, one can provide a terminal device which enables to open/close each of a first casing and a second casing 180°, thus allows an opening/closing operation of 360° in total.

DETAILED DESCRIPTION OF THE PREFERRED EMBODIMENTS

Hereinafter, based on the drawings, a biaxial hinge according to the invention will be described with reference to the embodiments in which it is applied to a notebook PC. The invention is not limited to use in a notebook PC, but also applicable to terminal devices and others, such as a mobile PC and PDA, comprising a first casing and a second casing which are connected to each other so as to be openable/closable 180° or more in an upward/downward direction.

Embodiment 1

Figure 1A:
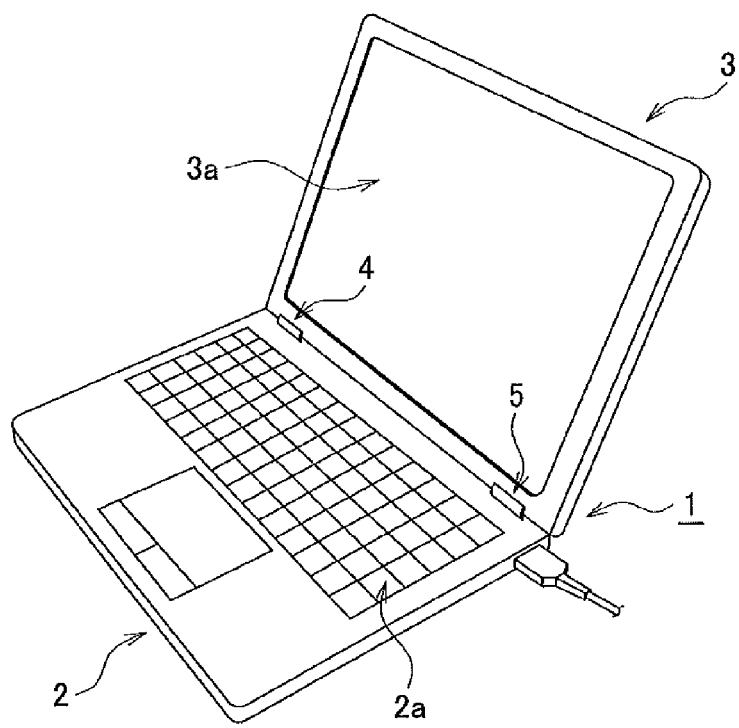
FIG. 1 shows a notebook PC being an example, to which biaxial hinges according to the invention are attached, FIG. 1(a) being a perspective view showing a first casing opened relative to a second casing, and FIG. 1(b)—a perspective view showing a first casing closed relative to a second casing.

FIGS. 1(*a*) and 1(*b*) show a notebook PC 1 being an example of a portable terminal using a biaxial hinge according to the invention. The notebook PC 1 comprises a first casing 2 provided with a key board portion 2*a* and a second casing 3 provided with a display portion 3*a*, and the casings are connected via a pair of biaxial hinges 4 and 5 to each other at spots on the right and left sides of their respective rear portions so as to be openable/closable.

Since biaxial hinges 4 and 5 are both identical in structure, a biaxial hinge 4 will be exclusively described in the following, and reference will not be made to other biaxial hinge 5. Of course, biaxial hinge denoted with reference numeral 5 can be manufactured in a manner different from the biaxial hinge 4, as long as no inconvenience occurs in operation.

Figure 7:
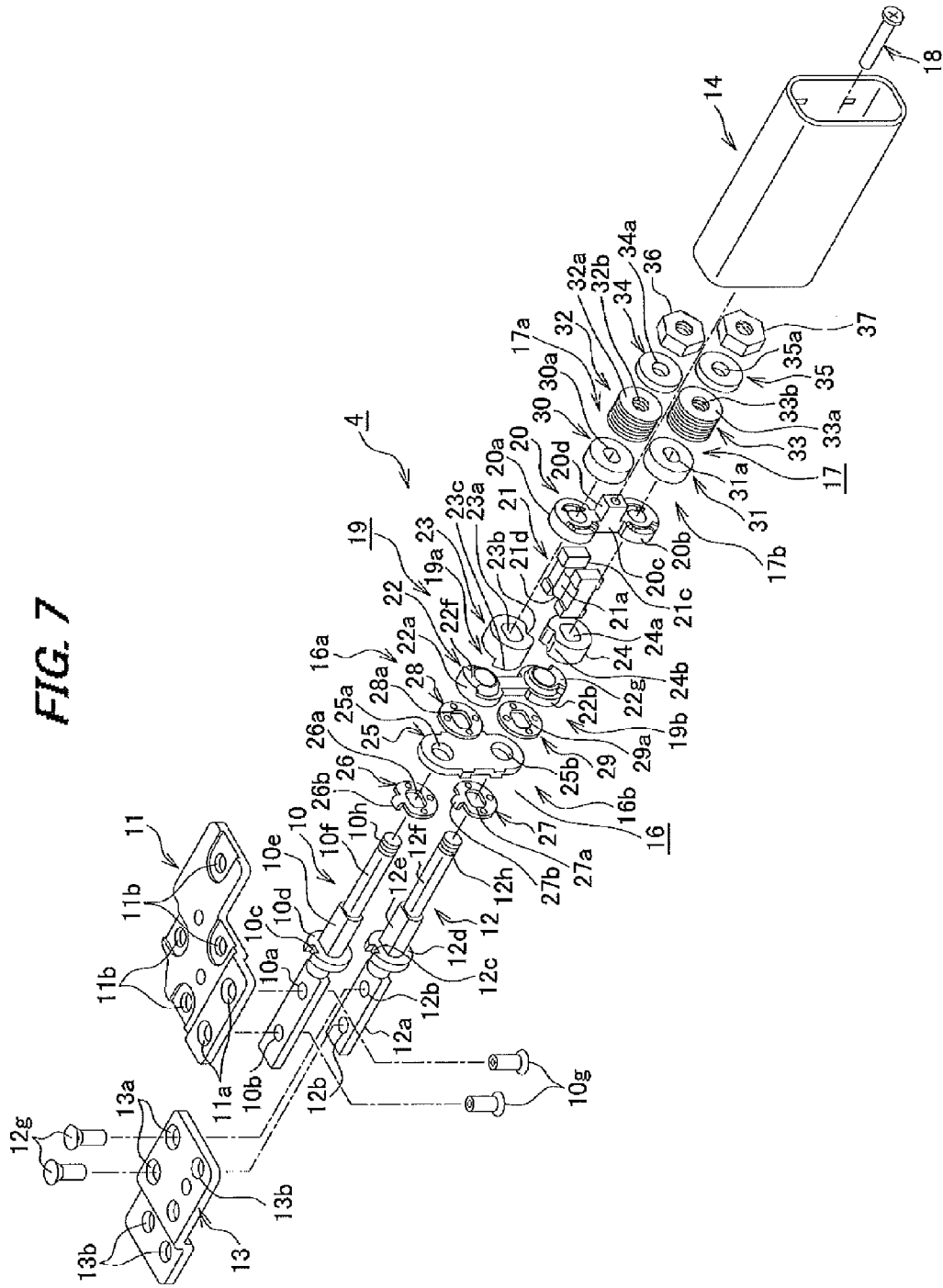
FIG. 7 is an exploded perspective view showing a biaxial hinge according to the invention which is exploded in a state as shown in FIG. 5.

FIGS. 2 to 19 show an embodiment of a biaxial hinge 4. In the drawings, a reference numeral 10 denotes a first hinge shaft, which comprises, as seen from one end in particular as shown in FIG. 7, an attaching shaft portion 10*a* having substantially trapezoidal shape in cross section and comprising attaching holes 10*b*, 10*b*, a flange portion 10*d* provided next to the attaching shaft portion 10*a* and comprising an engaging concave portion 10*c* on an outer circumference thereof, a first deformed shaft portion 10*e* provided next to the flange portion 10*d* and having substantially elliptic shape in cross section, a second deformed shaft portion 10*f* provided next to the first deformed shaft portion 10*e* and having substantially elliptic shape in cross section as well, but of a smaller diameter.

A first attaching plate 11 is attached to an attaching shaft portion 10*a*, as per mode of attaching, the former is attached to the latter by caulking respective ends of flanged attaching pins 10*g*, 10*g* as passing through attaching holes 10*b*, 10*b* of a first hinge shaft 10 and attaching holes 11*a*, 11*a* of the first attaching plate 11. And then, the first attaching plate 11 is so structured that it passes through attaching holes 11*b*, 11*b* of the first attaching plate 11 and is attached using attaching screws 6, 6 . . . to a second casing 3, as shown in particular in FIG. 2.

Next, a reference numeral 12 denotes a second hinge shaft, which is placed in parallel to a first hinge shaft 10 in upward/downward direction. The second hinge shaft comprises, as seen from one end in particular as shown in FIG. 7, an attaching shaft portion 12*a* having substantially trapezoidal shape in cross section and comprising attaching holes 12*b*, 12*b*, a flange portion 12*d* provided next to the attaching shaft portion 12*a* and comprising an engaging concave portion 12*c* on an outer circumference thereof, a first deformed shaft portion 12*e* provided next to the flange portion 12*d* and having substantially elliptic shape in cross section, a second deformed shaft portion 12*f* provided next to the first deformed shaft portion 12*e* and having substantially elliptic shape in cross section as well, but of a smaller diameter.

A second attaching plate 13 is attached to an attaching shaft portion 12*a*; as per mode of attaching, the former is attached to the latter by caulking respective ends of flanged attaching pins 12*g*, 12*g* as passing through attaching holes 12*b*, 12*b* of a second hinge shaft 12 and attaching holes 13*a*, 13*a* of the second attaching plate 13. And then, the second attaching plate 13 is so structured that it passes through attaching holes 13*b*, 13*b* of the second attaching plate 13 and is attached using attaching screws 7, 7 . . . to a first casing 2, as shown in particular in FIG. 2. Since the first attaching plate 11 and the second attaching plate 13 are respectively attached to the first casing 2 and the second casing 3, the first hinge shaft 10 and the second hinge shaft 12 are structured so as to be placed perpendicular to their axial direction and in parallel to each other.

A reference numeral 14 denotes a hinge case, in which a portion of a first hinge shaft 10 protruding from a flange portion 10*d* thereof is housed, leaving an attaching shaft portion 10*a* outside, as is a portion of a second hinge shaft 12 protruding from a flange portion 10*d* thereof with an attaching shaft portion 12*a*.

Figure 3:
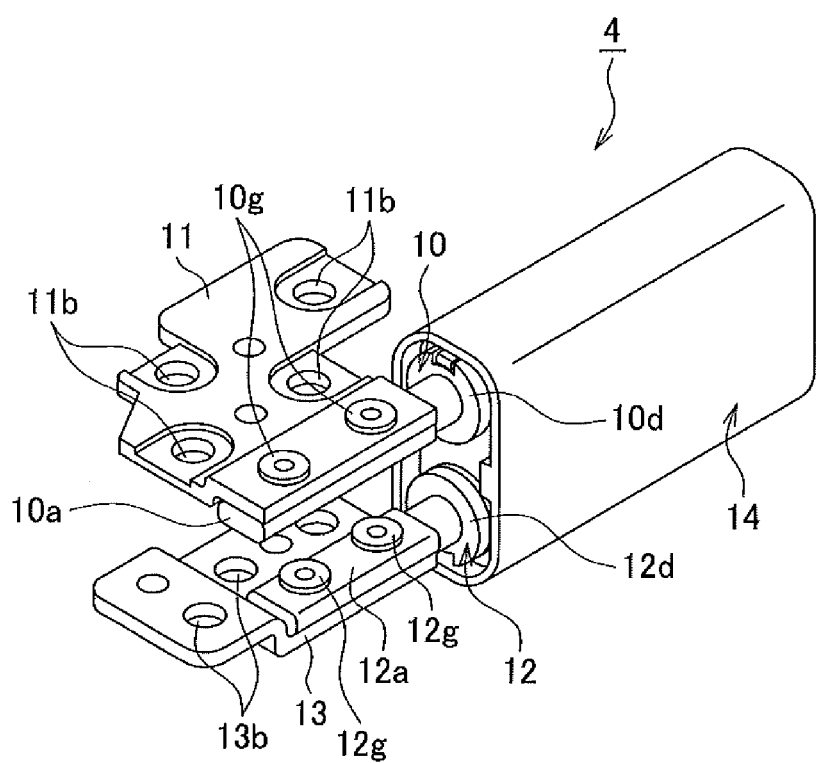
FIG. 3 is a perspective view of a biaxial hinge according to the invention as housed in a hinge case, when a first casing and a second casing rotate 180° respectively, one in a direction contrary to the other.
Figure 11A:
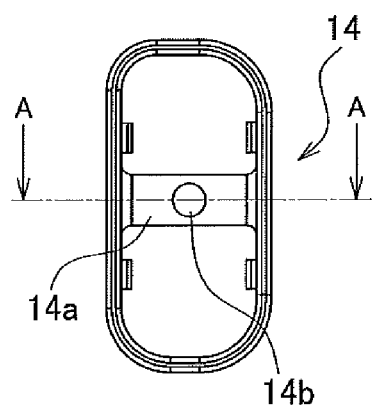
FIG. 11 shows a hinge case of a biaxial hinge according to the invention, FIG. 11(*a*) being a side view thereof, and FIG. 11(*b*)—a cross section according to A-A line in FIG. 11(*a*)
Figure 11B:
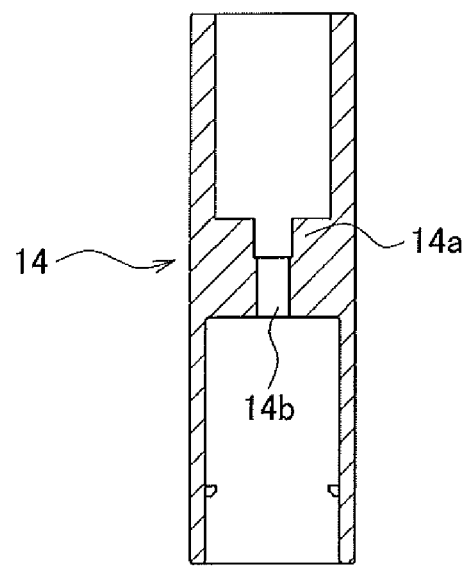
Figure 12A:
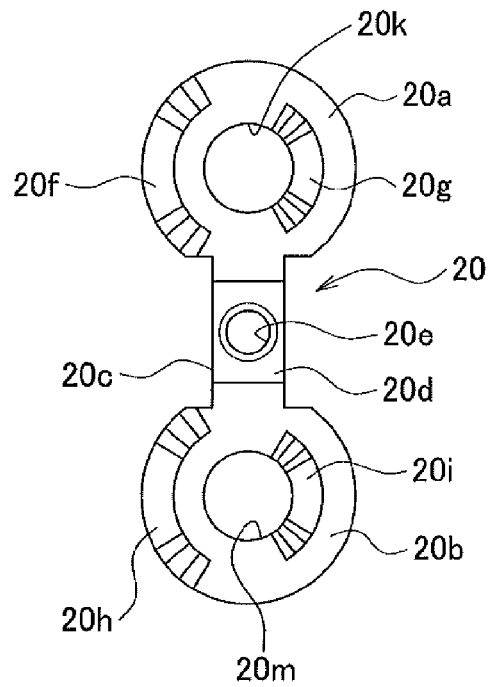
FIG. 12 shows a joint member of a biaxial hinge according to the invention, FIG. 12(*a*) being a side view thereof, and FIG. 12(*b*)—a perspective side view thereof.
Figure 12B:
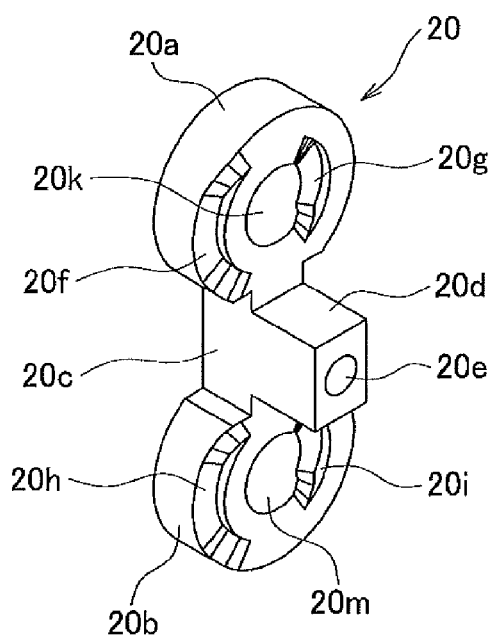

A hinge case 14 is cylindrical with a cross section in the shape of oblong hole, as shown in particular in FIGS. 3 and 11, and a selective rotation restricting means 15 (to be described below) attached to a first hinge shaft 10 and a second hinge shaft 12, a friction torque generating means 16, a suction means 17 and a stopper means 19 are housed inside the hinge case; a joint member 20 of the selective rotation restricting means 15 is fixed via an attaching screw 18, in particular in FIG. 7, to a partition wall 14*a* placed in the hinge case 14 and provided with a male screw portion 14*b*, in particular in FIG. 11. The hinge case 14 is housed in a housing concave portion 2*b* provided on a first casing 2 and a housing concave portion 3*b* provided on a second casing 3.

Next, a selective rotation restricting means 15 is described. The selective rotation restricting means 15 comprises a joint member 20, a locking member 21, a slide guide member 22, a first locking cam member 23 and a second locking cam member 24, these locking cam members being a pair. The joint member 20 has a substantially gourd-shaped side surface, and comprises an upper first bearing portion 20*a* and a lower second bearing portion 20*b*, both bearing portions being substantially disc-shaped, as well as a joint portion 20*c* connecting the first bearing portion 20*a* and the second bearing portion 20*b*. Further, a first bearing hole 20*k* and a second bearing hole 20*m*, each having a circular cross section, are provided on the first bearing portion 20*a* and the second bearing portion 20*b*. In this manner, the joint member 20 is so structured that a second deformed shaft portion 10*f* of a first hinge shaft 10 is inserted through and pivotally supported by the first bearing hole 20*k*, and a second deformed shaft portion 12*f* of a second hinge shaft 12 is inserted through and pivotally supported by the second bearing hole 20*m*. A projecting portion 20*d* provided with a female screw portion 20*e* is placed on the joint portion 20*c*, and so structured that it is attached via an attaching screw 18 to a partition wall 14*a* of a hinge case 14, as described above. Still further, the joint portion 20*c* is fitted into an engagement groove portion 21*c* of the locking member 21 provided with an upper first cam convex portion 21*a* and a lower second cam convex portion 21*b*, thus allowing for slide operation of the locking member 21 in an upward/downward direction.

In the same manner as a joint member 20, a slide guide member 22 is as well substantially gourd-shaped, also comprising an upper first bearing portion 22*a* and a lower second bearing portion 22*b*, both bearing portions being substantially disc-shaped, as well as a joint portion 22*c* connecting the first bearing portion 22*a* and the second bearing portion 22*b*. Further, a first bearing hole 22*d* and a second bearing hole 22*c* are provided on the first bearing portion 22*a* and the second bearing portion 22*b*. In this manner, the slide guide member 22 is so structured that a first deformed shaft portion 10*e* of a first hinge shaft 10 is inserted through and pivotally supported by the first bearing hole 22*d*, and a second deformed shaft portion 12*e* of a second hinge shaft 12 is inserted through and pivotally supported by the second bearing hole 20*m*. The joint portion 22*c* is fitted into other engagement groove portion 21*d* of the locking member 21, thus allowing for slide movement of the locking member 21 in an upward/downward direction. Furthermore, a first stopper portion 22*f* is formed on the first bearing portion 22*a* by cutting off a portion surrounding the first bearing hole 22*d*, and a second stopper portion 22*g* is formed on the second bearing portion 22*a* as well, by cutting off a portion surrounding the second bearing hole 22*e*.

Still further, locking cam members consist of upper and lower parts being a pair. An upper first locking cam member 23 is provided with a deformed insertion hole 23*a*, and a lower second locking cam member 24 with a deformed insertion hole 24*a*. A first deformed shaft portion 10*e* of a first hinge shaft 10 is inserted through and engaged with the deformed insertion hole 23*a*, so that the first locking cam member 23 is attached to the first hinge shaft 10, the former being restricted in rotation by the latter. Similarly, a second deformed shaft portion 12*e* of a second hinge shaft 12 is inserted through and engaged with the deformed insertion hole 24*a*, so that the second locking cam member 24 is attached to the second hinge shaft 12, the former being restricted in rotation by the latter. The first locking cam member 23 is provided with a first cam concave portion 23*b* on an outer circumference, the first cam concave portion reaching both ends in an axial direction, as well as with a first stopper piece 23*c* as assembled on the side facing a slide guide member 22, while the second locking cam member 24 is provided with a second cam concave portion 24*b* on an outer circumference, the second cam concave portion reaching both ends in an axial direction, as well as with a second stopper piece 24*c* as assembled on the side facing the slide guide member 22, the first stopper piece 23*c* abutting against a first stopper portion 22*f* formed on the slide guide member 22, while the second stopper piece 24*c* against a second stopper portion 22*g* formed on the slide guide member 22, depending on their respective rotation angle. Still further, the first locking cam member 23 and the second locking cam member 24 are both sandwiched between a joint member 20 and the slide guide member 22, and the first locking cam member 23 is placed above the locking member 21, and the second locking cam member 24 below it. The first cam concave portion 23*b* of the first locking cam member 23 opposes to a first cam convex portion 21*a* of the locking member 21, and the second cam concave portion 24*b* of the second locking cam member 24 to a second cam convex portion 21*b* of the locking member 21, the respective cam concave portions being thus fitted into the corresponding cam convex portions, depending on their rotational angle.

Next, a friction torque generating means is described. The friction torque generating means 16 comprises a first friction torque generating means 16*a* on the side of a first hinge shaft 10 and a second friction torque generating means 16*b* on the side of a second hinge shaft 12, but here reference is made to the friction torque generating means 16 as a whole. The friction torque generating means 16 comprises a friction plate 25 having an upper first bearing hole 25*a* and a lower second bearing hole 25*b*, wherein a first deformed shaft portion 10*e* of a first hinge shaft 10 is rotatably inserted through the first bearing hole 25*a*, and a first deformed shaft portion 12*e* of a second hinge shaft 12 through the second bearing hole 25*b*, the friction plate being provided between a slide guide member 22 and flange portions 10*d*, 12*d*; a first A friction washer 26 and a first B friction washer 27 having locking pieces 26*b*, 27*b* on an outer circumference, the locking pieces being engaged with a flange portion 10*d* of the first hinge shaft 10 and a flange portion 12*d* of the second hinge shaft 12, wherein a first deformed shaft portion 10*e* of the first hinge shaft 10 is inserted through and engaged with a deformed locking hole 26*a* provided in an axial direction of a locking piece 26*b*, so that the first hinge shaft 10 is rotatable, and a second deformed shaft portion 12*e* of the second hinge shaft 12 is inserted through and engaged with a deformed locking hole 27*a* provided in an axial direction of a locking piece 27b, so that the second hinge shaft 12 is rotatable, and in this manner the first A friction washer 26 and the first B friction washer 27 are placed between the flange portions 10d, 12d and the slide guide member 22; a second A friction washer 28 and a second B friction washer 29 having deformed insertion holes 28a, 29a, wherein the first deformed shaft portion 10e of the first hinge shaft 10 is inserted through and engaged with a deformed insertion hole 28a in an axial direction on the central portion, and the second deformed shaft portion 12e of the second hinge shaft 12 is inserted through and engaged with a deformed insertion hole 29a in an axial direction on the central portion, and in this manner, the second A friction washer 28 and the second B friction washer 29 are placed between the friction plate 25 and the slide guide member 22; a first elastic means 32 bringing the first A friction washer 26 and the second A friction washer 28 respectively into press contact with the friction plate 25 via the slide guide member 22; and a second elastic means 33 bringing the first B friction washer 27 and the second B friction washer 29 respectively into press contact with the friction plate 25 via the slide guide member 22.

Next, a suction means 17 comprises a first suction means 17a on the side of a first hinge shaft 10 and a second suction means 17b on the side of a second hinge shaft 12, but here reference is made to the suction means 17 as a whole. The suction means 17 comprises a first cam follower 30 and a second cam follower 31, wherein a second deformed shaft portion 10f of a first hinge shaft 10 is inserted through and engaged with the a deformed insertion hole 30a provided on a central portion of the first cam follower 30 in an axial direction and a second deformed shaft portion 12f of a second hinge shaft 12 is inserted through and engaged with the a deformed insertion holes 31a provided on a central portion of the second cam follower 31 in an axial direction, wherein a larger first A curved cam convex portion 30b provided on an outer side of the first cam follower 30 and a smaller first B curved cam convex portion 30c provided on an inner side of the first cam follower 30 are provided that they respectively face a larger first A curved cam concave portion 20f and a smaller first B curved cam concave portion 20g of a joint member 20, and wherein a larger second A curved cam convex portion 31b provided on an outer side of the second cam follower 31 and a smaller second B curved cam convex portion 31c provided on an inner side of the second cam follower 31 are so provided that they respectively face a larger second A curved cam concave portion 20h and a smaller second B curved cam concave portion 20i of the joint member 20; a first elastic means 32 consisting of a plurality of disc springs 32a, 32a, ... and a second elastic means 33 respectively consisting of a plurality of disc springs 33a, 33a, ..., wherein the first elastic means 32 contacts the first cam follower 30 and is provided, the second deformed shaft portion 10f of the first hinge shaft 10 being inserted through and engaged with an insertion hole 32b provided on a central portion of the first elastic means 32 in an axial direction, and the second elastic means 33 contacts the second cam follower 31 and is provided, the second deformed shaft portion 12f of the second hinge shaft 12 being inserted through and engaged with an insertion hole 33b provided on a central portion of the second elastic means 33 in an axial direction; a first pressing washer 34 in contact with the first elastic means 32 and a second pressing washer 35 in contact with the second elastic means 33, wherein the first pressing washer 34 is provided, the second deformed shaft portion 10f of the first hinge shaft 10 being inserted through and engaged with a deformed insertion hole 34a provided on a central portion of the first pressing washer 34 in an axial direction, and the second pressing washer 35 is so provided, the second deformed shaft portion 12f of the second hinge shaft 12 being inserted through and engaged with a deformed insertion hole 35a provided on a central portion of the second pressing washer 35 in an axial direction; a first clamping nut 36 screwed with a first male screw portion 10h provided on free end side of the first hinge shaft 10 and a second clamping nut 37 screwed with a second male screw portion 12h provided on free end side of the second hinge shaft 12.

Still further, a stopper means 19 comprises a first stopper means 19a on the side of a first hinge shaft 10 and a second stopper means 19b on the side of a second hinge shaft 12, but here reference is made to the stopper means 19 as a whole. The stopper means 19 comprises a first stopper piece 23c provided on a first locking cam member 23, a second stopper piece 24c provided on a second locking cam member 24, a first stopper portion 22f provided on a first bearing portion 22a of a slide guide member 22 and a second stopper portion 22g provided on a second bearing portion 22b of the slide guide member 22. The stopper means 19 thus restricts the position of a first casing 2 and a second casing 3 in a closed state, as well as their position in a fully-opened state (both casings are opened 180°).

Figure 1B:
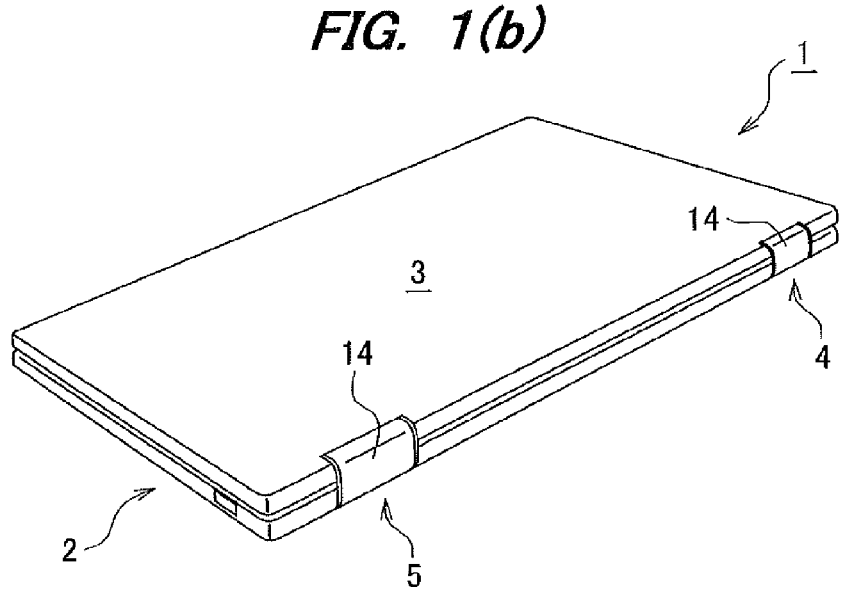
Figure 2:
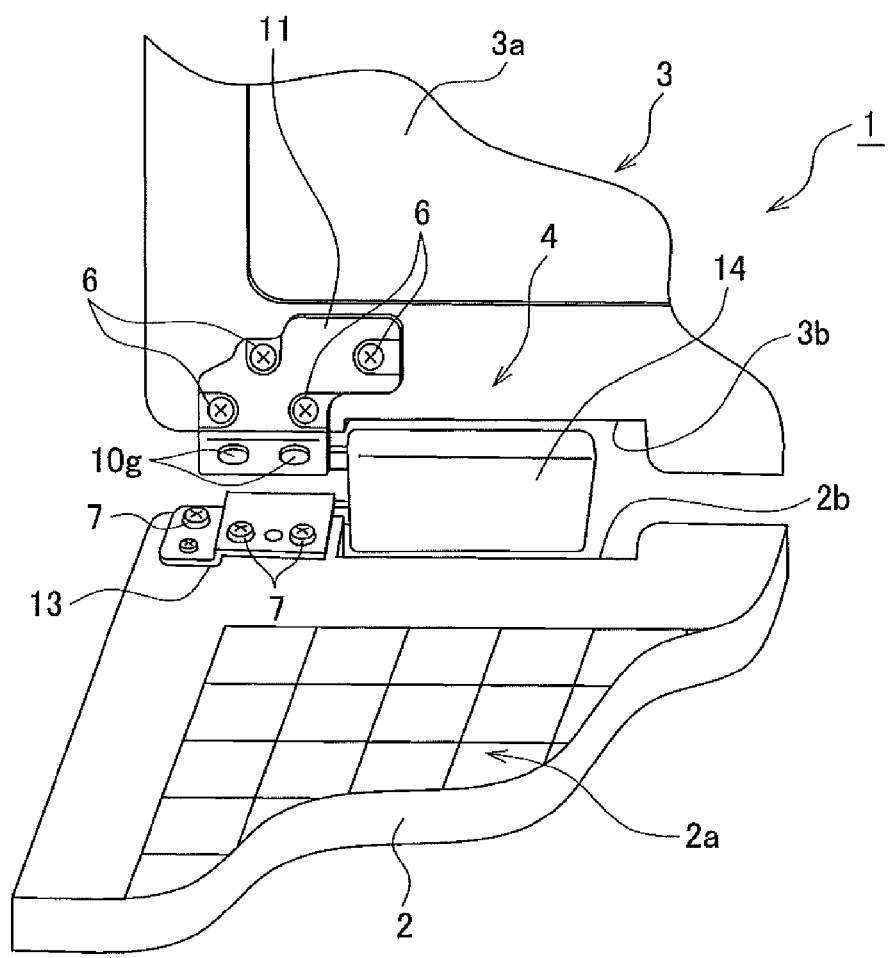
FIG. 2 is an explanatory view illustrating how biaxial hinges according to the invention are attached to a notebook PC.
Figure 4:
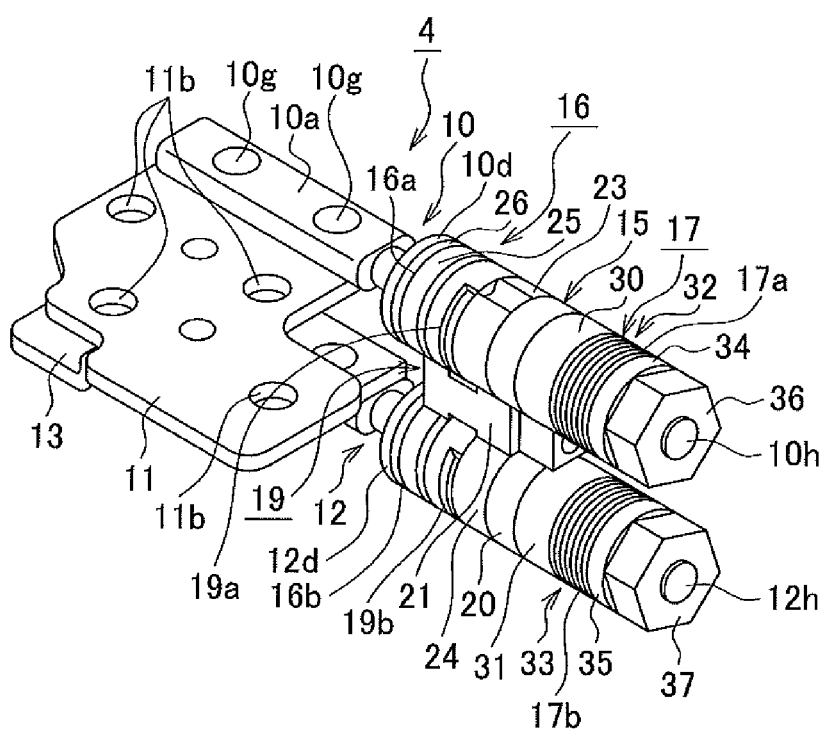
FIG. 4 is a perspective view showing a biaxial hinge according to the invention as removed from a hinge case, when a first casing is closed relative to a second casing, as seen from a point of view different from FIG. 3.
Figure 5:
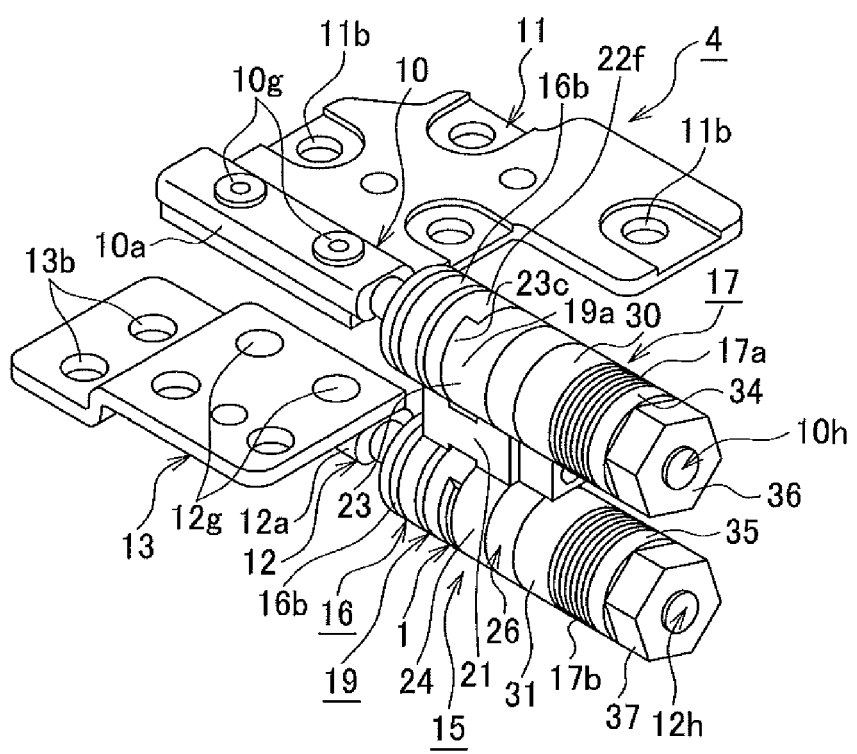
FIG. 5 is a perspective view showing a first hinge shaft of a biaxial hinge according to the invention as rotated 180° from a position of FIG. 4.
Figure 6:
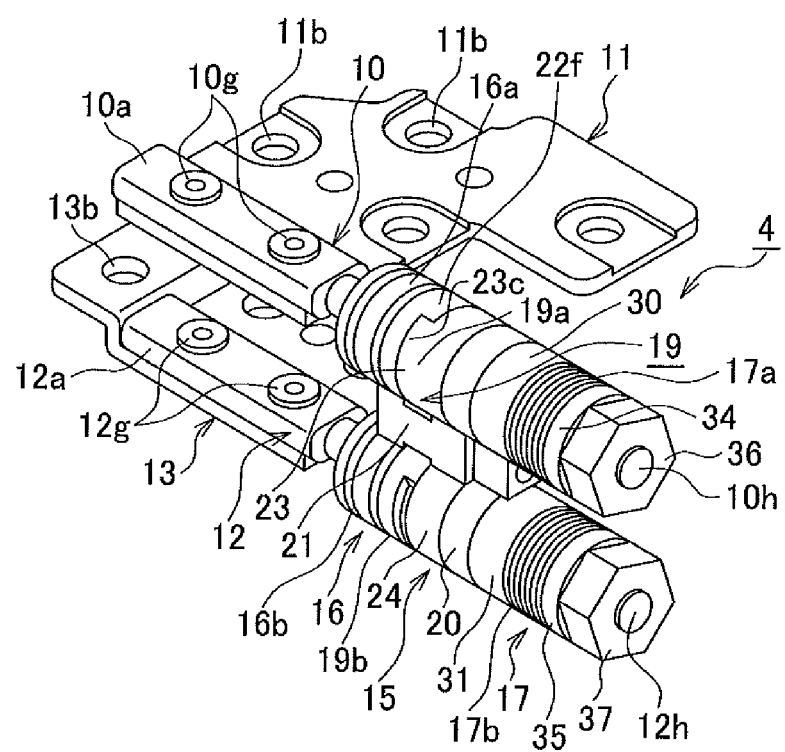
FIG. 6 is a perspective view showing a first hinge shaft and a second hinge shaft of a biaxial hinge according to the invention as having rotated 180° respectively from a position of FIG. 4, one in a direction contrary to the other.
Figure 8:
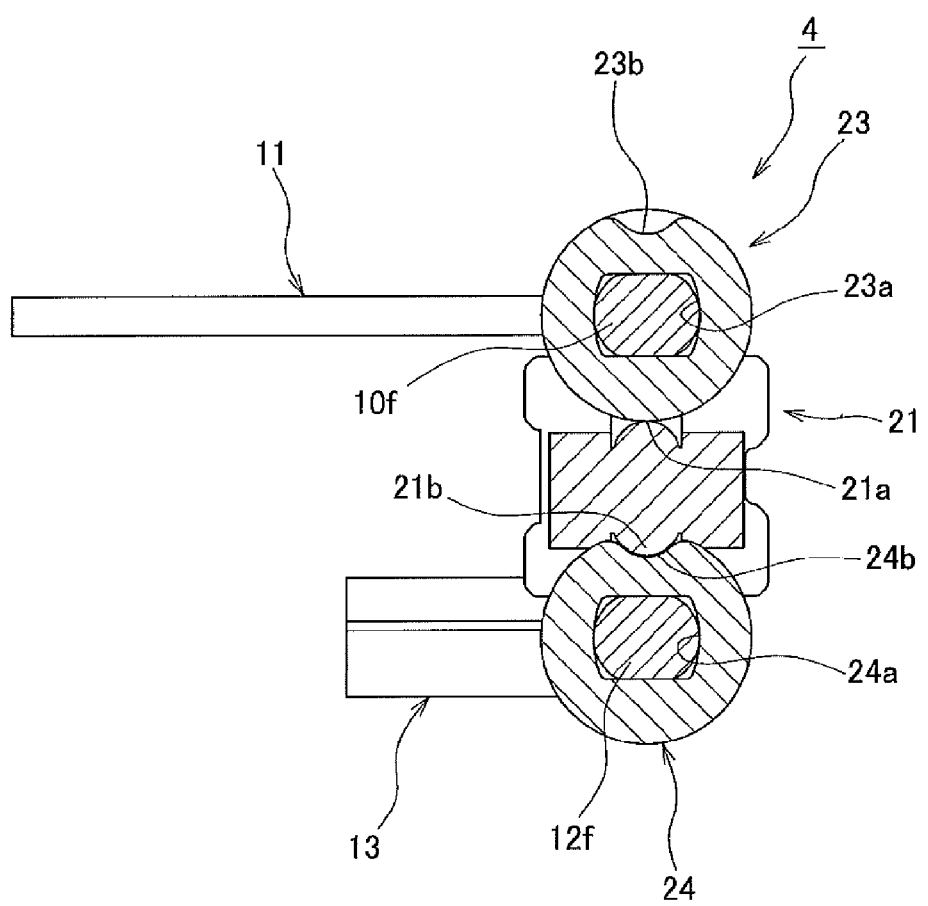
FIG. 8 is a longitudinal section showing a biaxial hinge according to the invention which is split at a selective rotation restricting means in a state as shown in FIG. 4.

Next, reference is made to an operation of the biaxial hinge 4 as described above according to the invention. First, in the state as shown in FIG. 1(b), the first casing 2 and the second casing 3 are entirely closed. Here, as shown in FIGS. 4 and 8, both the attaching plates, i.e. the first attaching plate 11 and the second attaching plate 13 face in the same direction, and as shown in FIG. 8, the first cam concave portion 23b of the first locking cam member 23 is placed above, with its outer circumference abutting against the first cam convex portion 21a of the locking member 21, and the second cam concave portion 24b of the second locking cam member 24 is fitted in the second cam convex portion 21b of the locking member 21. In this manner, in the closed state of the first casing 2 and the second casing 3, the first hinge shaft 10 is rotatable, while the second hinge shaft 12 is not. Accordingly, in the closed state of the first casing 2 and the second casing 3, the selective rotation restricting means 15 allows exclusively the second casing 3 to open/close relative to the first casing 2.

In this manner, when the operator tries to open the second casing 3 relative to the first casing 2, the first hinge shaft 10 rotates accordingly, the upper first cam convex portion 21a of the locking member 21 is opened as it is in contact with the outer circumference of the first locking cam member 23. Therefore, the selective rotation restricting means prevents the first casing 2 from rotating together with the second hinge shaft 12 during the opening/closing operation of the second casing 3. When the operator tries to further open the second casing 3 relative to the first casing 2, the second casing first confronts with a resistance arising during an escape of the first A curved cam convex portion 30b and the first B curved cam convex portion 30c of the first cam follower 30 of the first suction means 17a from the first A curved cam concave portion 20f and the first B curved cam concave portion 20g provided on the joint member 20; however, once the first A curved cam convex portion 30b and the first B curved cam convex portion 30c escape from the first A curved cam concave portion 20f and the first B curved cam concave portion 20g, the second casing 3 is further opened relative to the first casing 2. Since the friction torque is generated at this time between the upper first A friction washer 26 and the friction plate 25, as well as between the upper second A friction washer 28 and the friction plate 25, the both friction washers being the first friction torque generating means 16a, the second casing 3 always realizes free stop function while it is further opened relative to the first casing 2, so that it can be arrested and held at any opening angle. In the meantime, the friction torque generated at this time derives as well from the first suction means 17a of the suction means 17, however, the friction torque from the first suction means 17a is merely secondary. The principal friction torque is generated by the first friction torque generating means 16a at this time.

When the operator further opens the second casing 3 relative to the first casing 2 keeping free stop function in this manner, the first hinge shaft 10 is restricted in rotation at an angle of 180°, by the first stopper piece 23c of the first locking cam member 23 of the first stopper means 19a abutting against the first stopper portion 22f of the slide guide member 22, as shown in FIGS. 5, 7, 15, 16. In this manner, the second casing 3 stops at an opening angle of 180° relative to the first casing 2. At the same time, the first cam concave portion 23b of the first locking cam member 23 comes at an opening angle of 180° to the position of the first cam convex portion 21a of the locking member 21, thus generating the gap a, which allows the first casing 2 to rotate (be opened/closed).

In the meantime, if the operator tries to close the second casing 3 relative to the first casing 2 from an opening angle of 180°, he will find no difficulty in closing. In other words, when the second casing 3 rotates relative to the first casing 2 in the closing direction, the second casing 3 is closable relative to the first casing 2, since the gap a exists between the first cam concave portion 23b of the first locking cam member 23 rotating together with the first hinge shaft 10 and the first cam convex portion 21a of the locking member 21. Once the second casing 3 starts a rotational operation relative to the first casing 2, the outer circumference of the second casing 3 abuts against the first cam convex portion 21a, so that the second cam convex portion 21b of the locking member 21 remains fitted in the second cam concave portion 24b of the second locking cam member 24 as is fixed to the second hinge shaft 12. In this manner, the first casing 2 is as well restricted in rotation during the closing operation of the second casing 3.

As described above, the second casing 3 is freely openable/closable relative to the first casing 2 between 0° and 180°, while the first casing 2 remains restricted in rotation by the selective rotation restricting means 15 during the opening/closing operation of the second casing 3.

Figure 9:
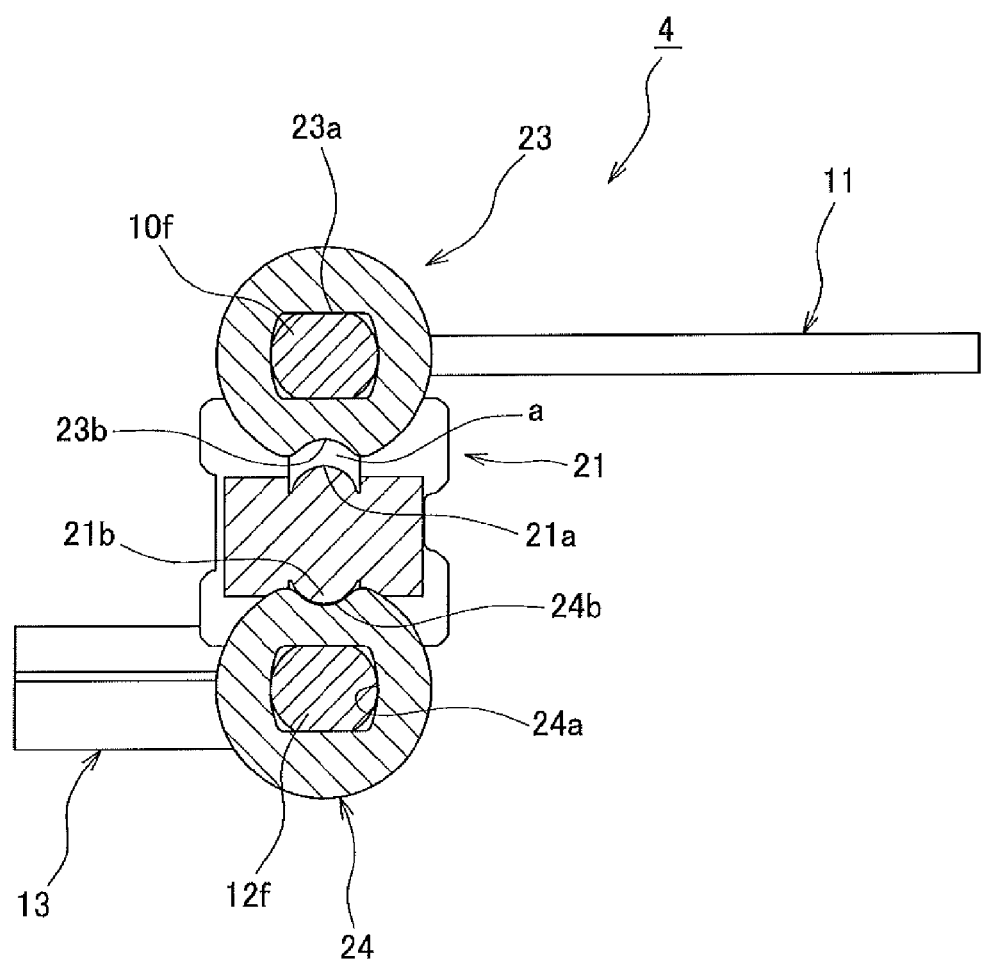
FIG. 9 is a longitudinal section showing a biaxial hinge according to the invention which is split at a selective rotation restricting means in a state as shown in FIG. 5.
Figure 10:
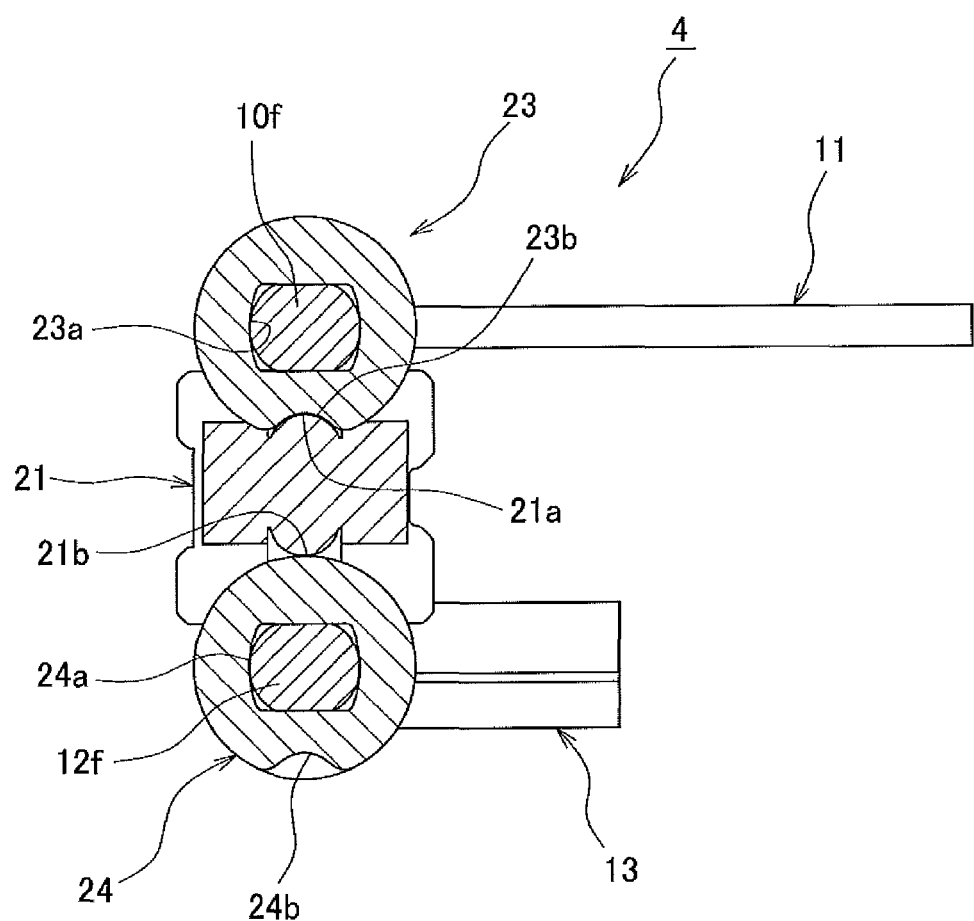
FIG. 10 is a longitudinal section showing a biaxial hinge according to the invention which is split at a selective rotation restricting means in a state as shown in FIG. 6.

Next, the first casing 2 will not undergo the opening/closing operation in the closed state relative to the second casing 3 as shown in FIG. 1(b), since the outer circumference of the first locking cam member 23 abuts against the first cam convex portion 21a of the locking member 21. However, once the second casing 3 is opened 180°, the first casing 2 can rotate up to 180° in a direction contrary to an opening direction of the second casing 3 fully opened. In other words, when the second casing 3 rotates 180°, the first cam concave portion 23b of the first locking cam member 23 as well has completed a rotation of 180°, so that it faces the first cam convex portion 21a of the locking member 21, thus generating the gap a between the both elements, as shown in FIG. 9; therefore, the second locking cam member 24, which is so attached to the second hinge shaft 12 that the former is restricted in rotation by the latter, is rotatable. And when the first casing 2 rotates, the outer circumference of the second locking cam member 24 abuts against the second cam convex portion 21b of the locking member 21, which prevents the closing operation of the second casing 3.

In this manner, when the operator tries to rotate the first casing 2 relative to the second casing 3, in a direction contrary to an opening direction of the second casing 3, the second hinge shaft 12 rotates accordingly, so that the lower second cam convex portion 21b of the locking member 21 is opened, the lower second cam convex portion abutting against the outer circumference of the second locking cam member 24. Therefore, the selective rotation restricting means 15 prevents the second casing 3 from rotating in a closing direction. When the operator tries to further rotate the first casing 2 relative to the second casing 3, the first casing first confronts with a resistance arising during an escape of the second A curved cam convex portion 31b and the second B curved cam convex portion 31c of the second cam follower 31 of the second suction means 17b from the second A curved cam concave portion 20h and the second B curved cam concave portion 20i provided on the joint member 20; however, once the second A curved cam convex portion 31b and the second B curved cam convex portion 31c of the second cam follower 31 escape from the second A curved cam concave portion 20h and the second B curved cam concave portion 20i, the first casing 2 further rotates relative to the second casing 3. Since the friction torque is generated at this time between the lower second B friction washer 29 and the friction plate 25, as well as between the lower first B friction washer 27 and the friction plate 25, the both friction washers being the second friction torque generating means 16b, the first casing 2 always realizes free stop function while it further rotates relative to the second casing 3, so that it can be arrested and held at any opening angle relative to the second casing 3. In the meantime, the friction torque generated at this time derives as well from the second suction means 17b of the suction means 17, however, the friction torque from the first suction means 17a is merely secondary. The principal friction torque is generated by the second friction torque generating means 16b of the friction torque generating means 16 at this time.

Figure 13A:
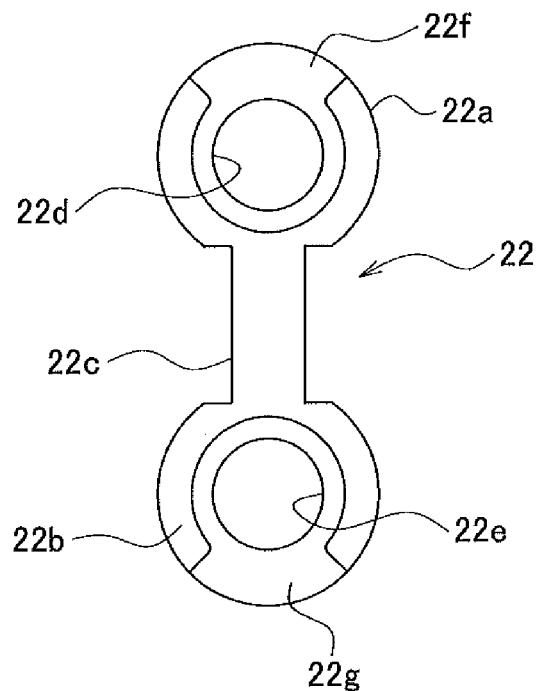
FIG. 13 shows a slide guide member of a biaxial hinge according to the invention, FIG. 13(*a*) being a side view thereof, and FIG. 13(*b*)—a perspective view thereof.
Figure 13B:
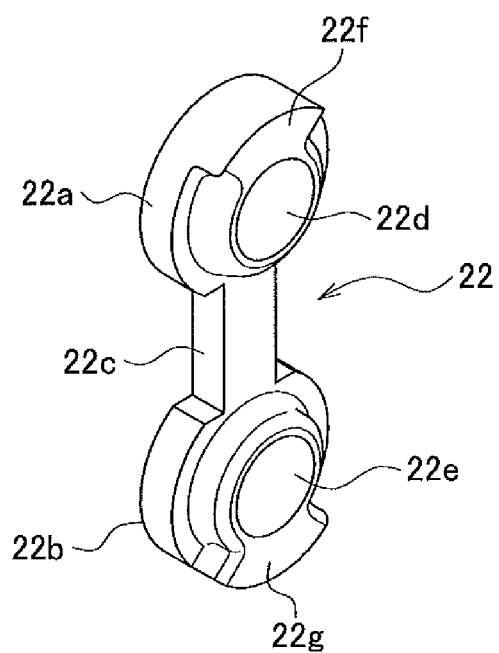
Figure 14A:
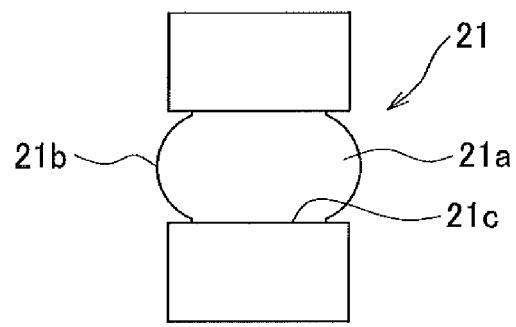
FIG. 14 shows a locking member of a biaxial hinge according to the invention, FIG. 14(*a*) being a side view thereof, and FIG. 14(*b*)—a perspective view thereof.
Figure 14B:
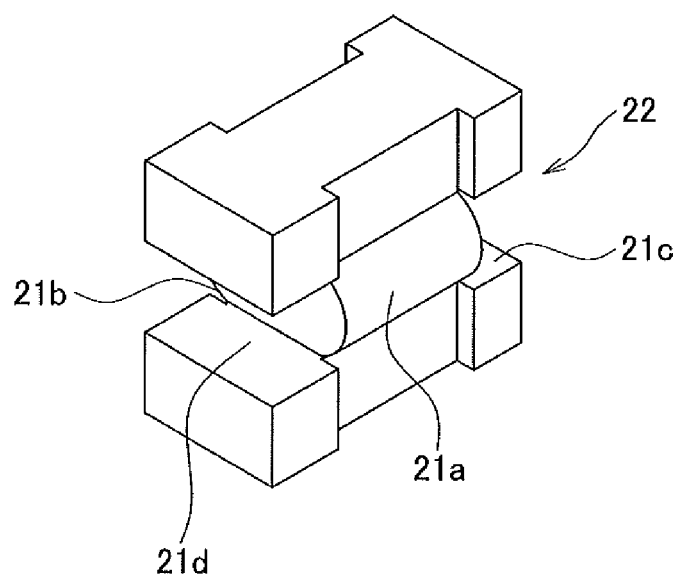
Figure 15A:
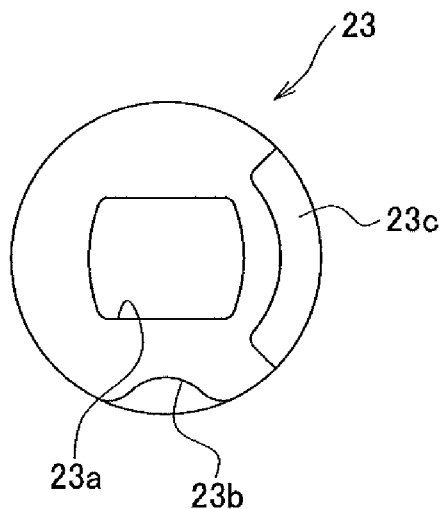
FIG. 15 shows an upper first locking cam member of a biaxial hinge according to the invention, FIG. 15(*a*) being a side view thereof, and FIG. 15(*b*)—a perspective view thereof.
Figure 15B:
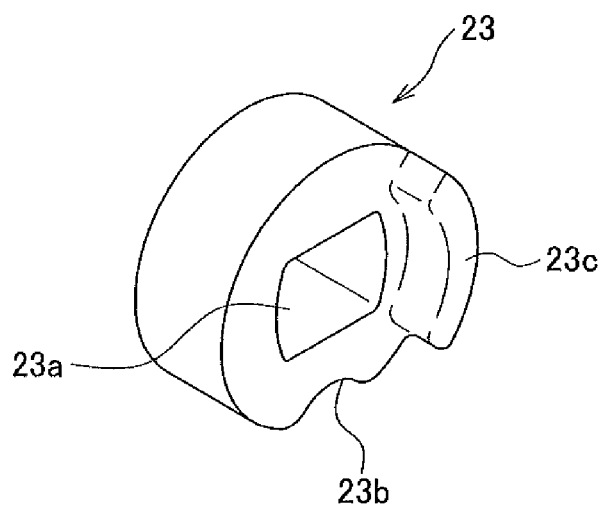
Figure 16A:
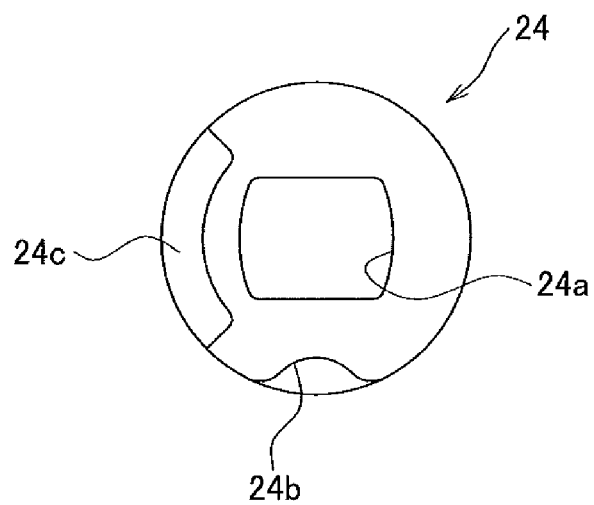
FIG. 16 shows a lower second locking cam member of a biaxial hinge according to the invention, FIG. 16(*a*) being a side view thereof, and FIG. 16(*b*)—a perspective view thereof.
Figure 16B:
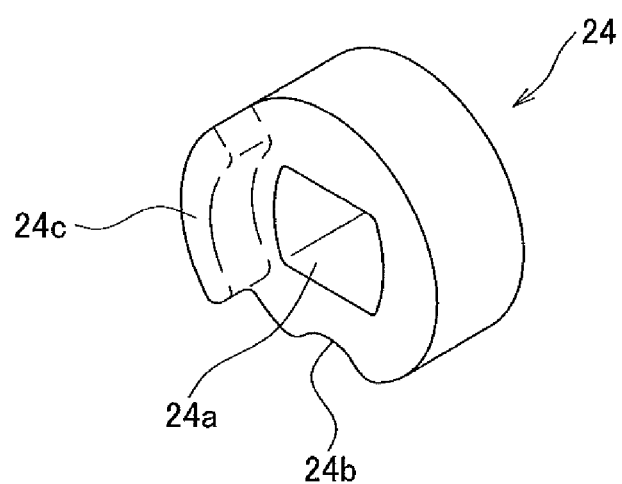
Figure 17:
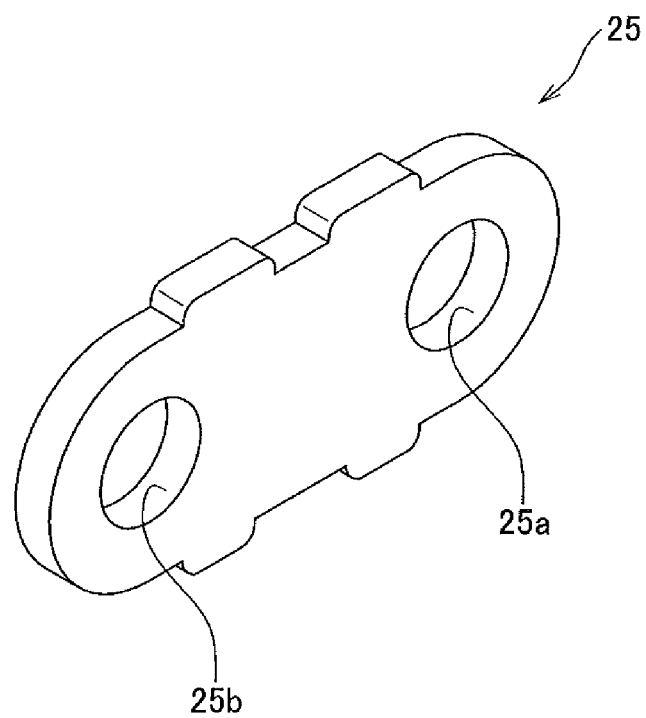
FIG. 17 is a perspective view showing a friction plate of a biaxial hinge according to the invention.
Figure 18A:
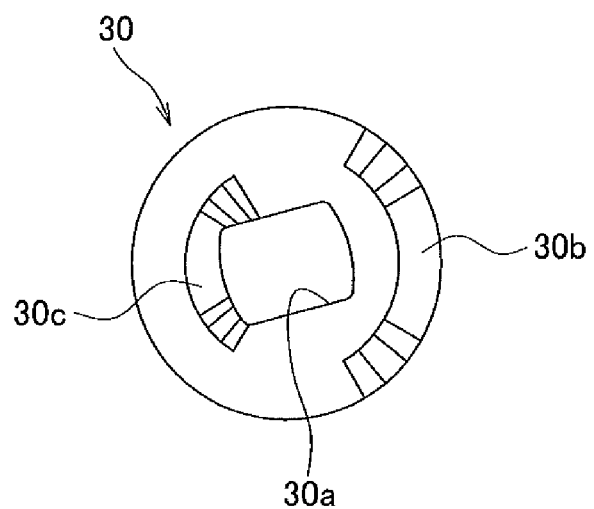
FIG. 18 shows an upper first cam follower of a biaxial hinge according to the invention, FIG. 18(*a*) being a side view thereof, and FIG. 18(*b*)—a perspective view thereof.
Figure 18B:
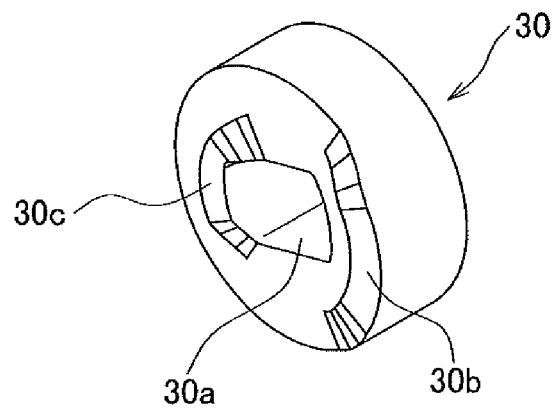
Figure 19A:
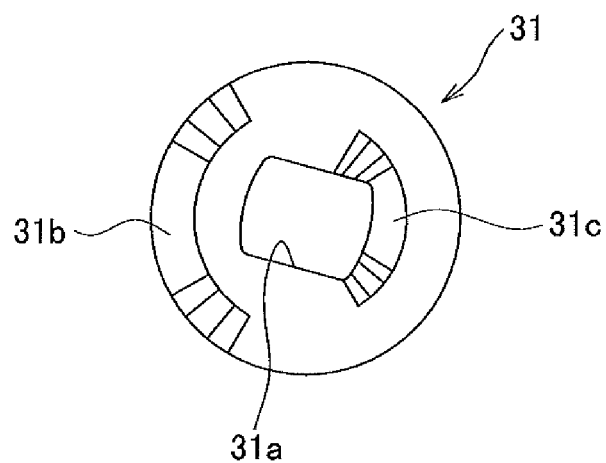
FIG. 19 shows a lower second cam follower of a biaxial hinge according to the invention, FIG. 19(*a*) being a side view thereof, and FIG. 19(*b*)—a perspective view thereof.
Figure 19B:
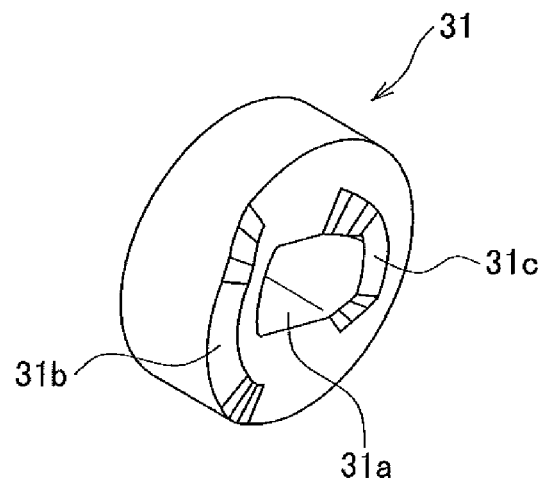

When the first casing 2 further rotates relative to the second casing 3 keeping free stop function in this manner, the second hinge shaft 10 is restricted in rotation at 180°, by the second stopper piece 24c of the second locking cam member 24 being the second stopper means 19b abutting against the second stopper portion 22g of the slide guide member 22, as is comprehensible from what is shown in FIGS. 7, 13 and 16. In this manner, the first casing 2 stops at an opening angle of 180° relative to the second casing 3. This position corresponds to the state in which the first casing 2 overlaps the second casing 3.

In the meantime, if the operator tries to return the first casing 2 to its initial position from an opening angle of 180° relative to the second casing 3, he will find no difficulty in returning. In other words, when the first casing 2 rotates relative to the second casing 3 from the state shown in FIG. 10 in the closing direction, the first casing 2 is rotatable relative to the second casing 3 toward the initial position of the first casing 2, since the outer circumference of the second cam concave portion 24b of the second locking cam member 24 rotating together with the second hinge shaft 12 abuts against the second cam convex portion 21b of the locking member 21, so that the first cam convex portion 21a of the locking member 21 remains fitted in the first cam concave portion 23b of the first locking cam member 23 as is fixed to the first hinge shaft 10. At this time, the second casing 3 is as well restricted in opening/closing operation since the first cam concave portion 23b of the first locking cam member 23 as is fixed to the first hinge shaft 10 remains fitted in the first cam convex portion 21a of the locking member 21.

As described above, the first casing 2 is freely openable/closable relative to the second casing 3 between 0° and 180°, once the second casing 3 is opened 180° relative to the first casing 2; on the other hand, the second casing 3 remains restricted in the opening/closing operation by the selective rotation restricting means 15. As is evident from the foregoing description, the first casing 2 and the second casing 3 are selectively openable/closable by the selective rotation restricting means 15, and the one is restricted in opening/closing operation during the opening/closing operation of the other.

Embodiment 2

As described in the foregoing, in the invention according to embodiment 1, exclusively the second casing 3 is openable/closable relative to the first casing 2 from a closed state, and when the second casing 3 is opened to any opening angle relative to the first casing 2, i.e. during its opening/closing operation, the first casing 2 cannot open/close (or rotate) relative to the second casing 3. On the other hand, once the second casing 3 is opened 180° relative to the first casing 2, the first casing 2 can be opened/closed (or rotate), and during its opening/closing operation, the second casing 3 cannot be opened/closed (or rotate) relative to the first casing 2.

In contrast, a biaxial hinge according to embodiment 2 allows both a first casing 2 and a second casing 3 to be opened/closed in a closed state, in which the first casing 2 overlaps the second casing 3; during opening/closing operation of either one of the casings, the other is not openable/closable. Moreover, when the first casing 2 is opened at a predetermined opening/closing (or rotational) angle relative to the second casing 3, both the first casing 2 and the second casing 3 are openable/closable; once either one of the casings is under opening/closing operation from the angle, the other is not openable/closable.

Figure 20:
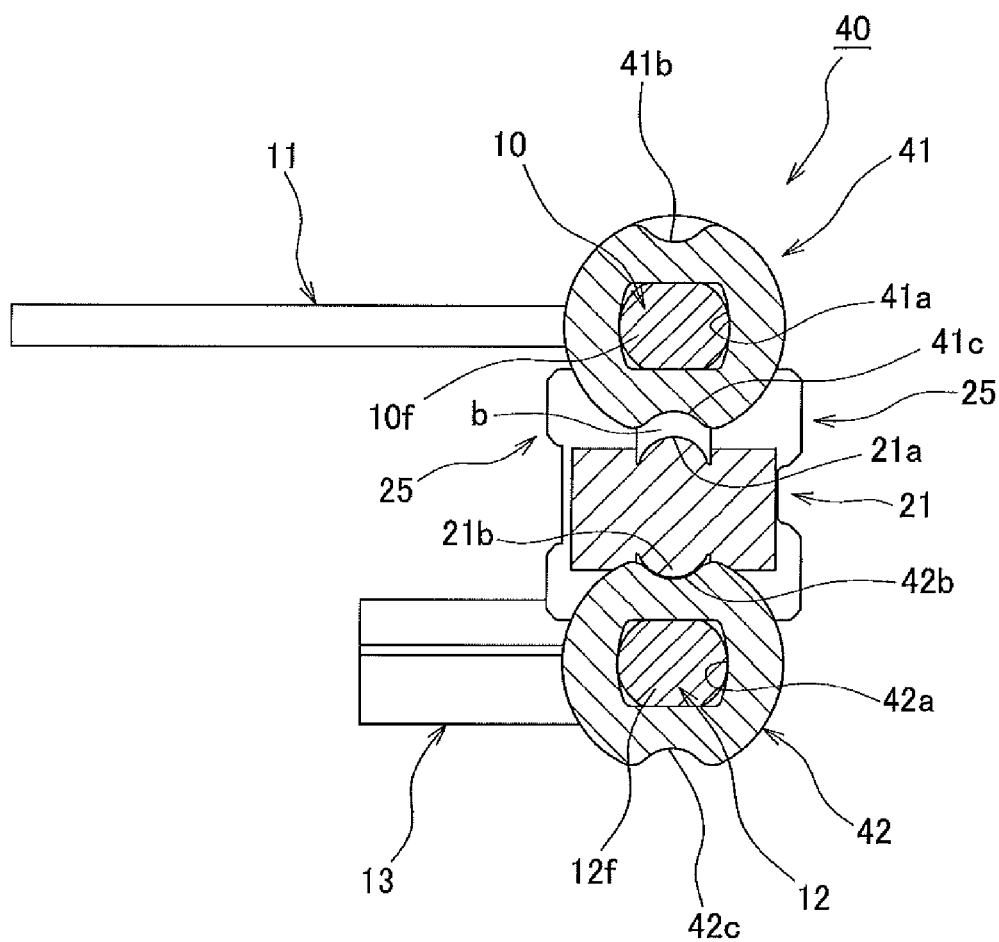
FIG. 20 is a longitudinal section illustrating an operation of other embodiment of a selective rotation restricting means of a biaxial hinge according to the invention.
Figure 21:
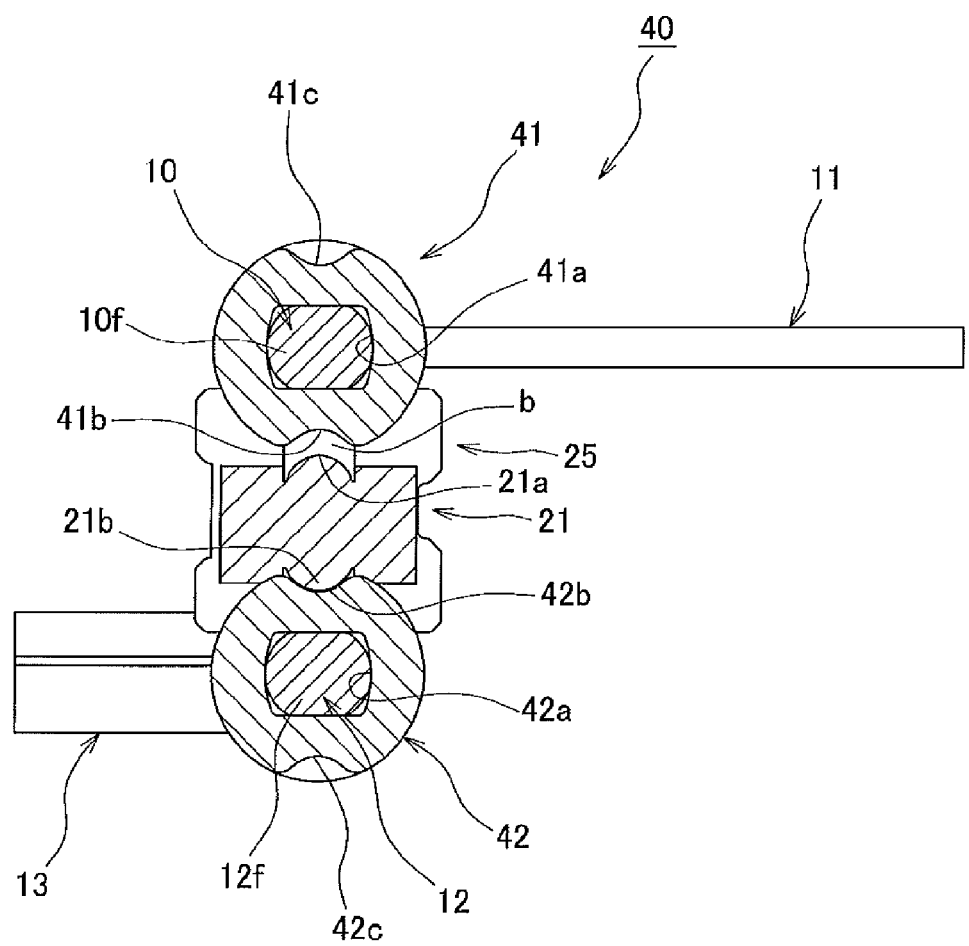
FIG. 21 is a longitudinal section illustrating an operation of a selective rotation restricting means of a biaxial hinge according to the invention, as shown in FIG. 20.
Figure 22:
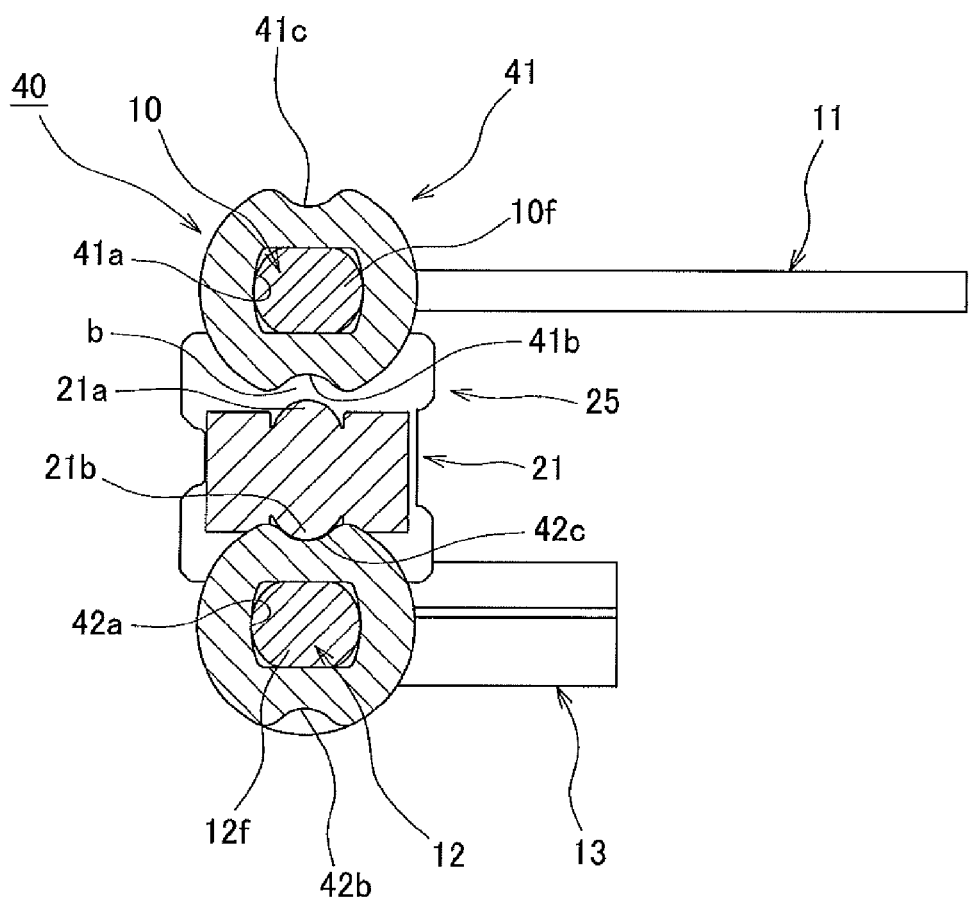
FIG. 22 is a longitudinal section illustrating an operation of a selective rotation restricting means of a biaxial hinge according to the invention, as shown in FIG. 20.

Namely, according to FIGS. 20 to 22, a biaxial hinge 40 according to embodiment 2 is so structured that a first A cam concave portion 41b and a first B cam concave portion 41c are provided 180° apart from each other on an outer circumference of a first locking cam member 41, and that a second A cam concave portion 42b and a second B cam concave portion 42c are provided 180° apart from each other on an outer circumference of a second locking cam member 42; additionally, a second deformed shaft portion 10f of a first hinge shaft 10 is inserted through and engaged with a deformed insertion hole 41a of the first locking cam member 41, and a second deformed shaft portion 12f of a second hinge shaft 12 is inserted through and engaged with a deformed insertion hole 42a of the second locking cam member 42. In the meantime, the identical reference numerals denote the identical elements.

Accordingly, when the first casing (not shown) is closed relative to the second casing (not shown), as shown in FIG. 20, the first cam convex portion 21a of the locking member 21 faces the first B cam concave portion 41c of the first locking cam member 41 and the second cam convex portion 21b of the locking member 21 faces the second A cam concave portion 42b of the second locking cam member 42, so that the gap b is generated. In this manner, both of the first hinge shaft 10 and the second hinge shaft 12 are rotatable, which means that both of the first casing and the second casing are openable/closable.

However, once either one of the first casing and the second casing is under opening/closing operation, either one of the first locking cam member 41 and the second locking cam member 42 rotates with a rotational movement of either one of the first hinge shaft 10 and the second hinge shaft 12. And the rotational movement of either one of the locking cam members brings either one of the first cam convex portion 21a and the second cam convex portion 21b of the locking member 21 into contact with the outer circumference of either one of the first locking cam member 41 and the second locking cam member 42, which restricts the other in rotation.

FIG. 21 shows a state in which a second casing 3 is opened 180° relative to a first casing 2. Namely, this state allows the second casing 3 to rotate in a closing direction in order to return to its initial position, as well as allows the first casing 2 to rotate in a contrary direction relative to the second casing 3 from the state in which the second casing 3 is opened 180° relative to the first casing 2. Needless to say, when either one of the first casing 2 and the second casing 3 is under rotation, the other is restricted in rotation.

Still further, even when the second casing 3 is opened 180° relative to the first casing 2, the first cam convex portion 21a of the locking member 21 faces the first B cam concave portion 41c of the first locking cam member 41 and the second cam convex portion 21b of the locking member 21 the second B cam concave portion 42c of the second locking cam member 42, so that both of the first hinge shaft 10 and the second hinge shaft 12 are rotatable, which means that both of the first casing and the second casing are openable/closable, as shown in FIG. 22. However, once either one of the first casing and the second casing is under opening/closing operation, respective outer circumferences of the first locking cam member 41 and the second locking cam member 42 abuts against either one of the first cam convex portion 21a and the second cam convex portion 21b of the locking member 21, as described above, so that the other casing is restricted in opening/closing operation.

Even if the biaxial hinge is implemented in the above-described manner, it results in certain regularity in opening/closing operation of the first casing 2 and the second casing 3, so that the object of the invention can be achieved. In the meantime, the foregoing is merely an example, and the scope of the invention is not limited to it, and as per position of a first cam concave portion 23b and a second cam concave portion 23b, they can be provided at any angle on respective outer circumferences of a first locking cam member 23 and a second locking cam member 24.

Therefore, as is evident from the foregoing description, a biaxial hinge 4, 40 according to the invention enables a first casing 2 and a second casing 3 to respectively open/close up to 180° one after another thus 360° in total. However, their opening/closing angle is not particularly limited.

Still further, while assuring the original use of the notebook PC, the biaxial hinge enables to fold a first casing and a second casing in the same direction, in order to obtain substantially L-shaped position, chevron-shaped position, and a flat position in which both casings are entirely folded. If the second casing is turned to the operator in the flat position, he can use the terminal device as a tablet device, which provides for an additional use.

As is evident from the foregoing description and in addition to what is described above, the invention is more efficient in that it enables a first elastic means 32 and a second elastic means 33 to work on both mechanisms of a friction torque generating means 16 and a suction means 17, and facilitates use of profiles of a locking member and locking cam members, as well as optional changes of cam profiles of a suction means, which makes design of cam characteristics much easier. In this manner, the invention enables to prevent fluctuation of opening angles at a specific angle, and to provide for a suction function at a specific angle.

In the meantime, additional embodiments include cam convex portions and cam concave portions radially provided from respective shaft centers to respective outer circumferences of a joint member 20, a first cam follower 30 and a second cam follower 31, wherein the cam convex portions and the cam concave portions can be used in place of a first A curved cam concave portion 20f, a first B curved cam concave portion 20g, a second A curved cam concave portion 20h and a second B curved cam concave portion 20i provided on a joint member 20, a first A curved cam convex portion and a first B curved cam convex portion of the first cam follower 30, and a second A curved cam convex portion and a second B curved cam convex portion of the second cam follower 31. Moreover, disc springs used for a first elastic means 32 and a second elastic means 33 can be replaced with spring washers, compression coil springs and any other elements of synthetic resin like rubber. Still further, it is also possible to merely caulk the ends of a first hinge shaft 10 and a second hinge shaft 12 instead of using a first clamping nut 36 and a second clamping nut 37. Still further, a first casing 2 can be structured by optional changes of positions of respective first cam concave portions and respective second cam concave portions, such that it is openable/closable prior to a second casing 3. Still further, an omission of a hinge case 14 does not result in difficulty which functions of a biaxial hinge 4, 5, 40 may find, but the hinge with a hinge case 14 has an advantage that it has slimmed appearance, since it prevents a selective rotation restricting means, a friction torque generating means and a suction means from protruding outside.

The invention is, structured as in the foregoing, suitable as a biaxial hinge which is used to open/close a first casing and a second casing of a terminal device like notebook PC and others, relative to each other. Namely, it is suitable in use for notebook PC functioning also as tablet device.

What is claimed is:

1. A biaxial hinge for a terminal device having a first casing provided with a keyboard portion and a second casing provided with display portion, the biaxial hinge comprising;

a first hinge shaft mounted to a side of a first casing via a first attaching plate;

a second hinge shaft mounted to a side of a second casing via a second attaching plate;

a plurality of joint elements provided at predetermined intervals, the plurality of joint elements comprising a friction plate, a slide guide member, and a joint member, and at least one bearing hole, each of said first hinge shalt and said second hinge shaft being rotatably connected to each of said bearing holes of said plurality of joint elements in the same direction and at predetermined intervals;

means for selectively restricting the rotation of said first hinge shaft and said second hinge shaft, said means for selectively restricting the rotation provided between said first hinge shaft and said second hinge shaft and between said slide guide member and said joint member;

means for generating friction comprising means for generating first friction torque of said first hinge shaft and means for generating second friction torque of said second hinge shaft;

means for suctioning the rotation comprising, means for first suctioning the rotation of said first hinge shaft having a cam concave portion provided with an upper first bearing portion of said joint member and a cam convex portion provided with a first cam follower attached to said first hinge shaft, and means for second suctioning the rotation of said second hinge shaft having a cam concave portion provided with a lower second bearing portion of said joint member and a cam convex portion provided with a second cam follower attached to said second hinge shaft;

means for stopping with predetermined rotation angle each of said first hinge shaft and said second hinge shaft, said means for stopping comprising, means for first stopping of said first hinge shaft having a first stopper piece provided on a first locking cam member and a first stopper portion provided on a first bearing portion of a slide guide member, and means for second stopping of said second hinge shaft having a second stopper piece provided on a second locking cam member and a second stopper portion provided on a second bearing portion of the slide guide member; and means for pressing each of said means for generating friction torque and said means for suctioning the rotation, said means for pressing comprising, a first elastic means for said first hinge shat having a plurality of disc springs, and a second elastic means for said second hinge shaft having a plurality of disc springs, wherein said means for selectively restricting the rotation comprising an engagement groove portion engaged with said joint member; and an engagement groove portion engaged with said slide guide member, a locking member mounted between said joint member and said slide guide member in a longitudinal direction and further comprises, an upper first locking cam member having an upper first cam convex portion provided on an outer circumference thereof, said upper first locking cam member attached to said first hinge shaft in between said joint member and said sliding guide member, a lower second locking cam member having a lower second cam convex portion provided on an outer circumference thereof, said lower second locking cam member attached to said second hinge shaft in between said joint member and said sliding guide member, and said a locking member slidably mounted between said upper first locking cam and said lower second locking cam in longitudinal direction and having an upper first cam convex portion and a lower second cam convex portion, alternately fitted into said upper first cam convex portion and said lower second cam convex portion by rotation angles of said first hinge shaft and said second hinge shaft, wherein said means for generating first friction torque of said first hinge shaft comprises an upper first A friction washer provided between an upper portion of said friction plate and a flange portion of said first hinge shaft, said upper A friction washer being restricted in rotation by said first hinge shaft, an upper second A friction washer provided between said friction plate and said slide guide member, said upper second A friction washer being restricted in rotation by said first hinge shaft, and wherein said means for generating second friction torque of said second hinge shaft comprises a lower A friction washer provided between a lower portion of said friction plate and a flange portion of said second hinge shaft, said lower A friction washer being restricted in rotation by said second hinge shaft, a lower second A friction washer provided between said friction plate and said slide guide member, said lower second A friction washer being restricted in rotation by said second hinge shaft.

* * * * *